United States Patent
Odagiri et al.

(10) Patent No.: US 9,621,693 B2
(45) Date of Patent: Apr. 11, 2017

(54) WIRELESS COMMUNICATION DEVICE

(71) Applicant: Sony Computer Entertainment Inc., Tokyo (JP)

(72) Inventors: Kazuya Odagiri, Kanagawa (JP); Issei Chigusa, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/896,832

(22) PCT Filed: Jun. 19, 2014

(86) PCT No.: PCT/JP2014/066363
§ 371 (c)(1),
(2) Date: Dec. 8, 2015

(87) PCT Pub. No.: WO2014/203982
PCT Pub. Date: Dec. 24, 2014

(65) Prior Publication Data
US 2016/0134731 A1    May 12, 2016

(30) Foreign Application Priority Data

Jun. 20, 2013    (JP) ................ 2013-129398

(51) Int. Cl.
*H04M 1/00*   (2006.01)
*H04M 1/02*   (2006.01)
(Continued)

(52) U.S. Cl.
CPC .......... *H04M 1/0274* (2013.01); *H01Q 1/521* (2013.01); *H01Q 21/28* (2013.01); *H04B 1/3827* (2013.01)

(58) Field of Classification Search
CPC . H04M 1/0274; H04B 1/3827; H04B 1/3833; H04B 1/48; H04B 1/44;
(Continued)

(56) References Cited

U.S. PATENT DOCUMENTS 7,557,762 B2    7/2009  Shimazaki
7,786,938 B2 *  8/2010  Sorvala ................. H01Q 1/243
                                              343/700 MS
(Continued)

FOREIGN PATENT DOCUMENTS

JP    2004096464 A    3/2004
JP    2007243455 A    9/2007
(Continued)

OTHER PUBLICATIONS

International Search Report for corresponding PCT Application No. PCT/JP2014/066363, 2 pages, dated Jul. 15, 2014.
(Continued)

*Primary Examiner* — Nhan Le
(74) *Attorney, Agent, or Firm* — Matthew B. Dernier, Esq.

(57) ABSTRACT

Provided is a wireless communication device that ensures reduced interference between a plurality of antennas without relatively separating the antennas. The wireless communication device includes a first antenna, a second antenna, and a planar conductor. The conductor is arranged adjacent to both of the first and second antennas on one side. A cutout portion is formed in the conductor. The cutout portion extends from an outer edge between positions adjacent to the first and second antennas.

8 Claims, 11 Drawing Sheets

(51) Int. Cl.
*H01Q 21/28* (2006.01)
*H01Q 1/52* (2006.01)
*H04B 1/3827* (2015.01)

(58) Field of Classification Search
CPC .......... H04B 1/52; H04B 1/406; H04B 1/525; H01Q 1/242; H01Q 1/243; H01Q 1/244; H01Q 1/084
USPC ............ 455/78, 82, 83, 550.1, 575.1, 575.5, 455/575.7, 90.3
See application file for complete search history.

(56) References Cited

U.S. PATENT DOCUMENTS

| | | | |
|---|---|---|---|
| 7,903,030 B2 * | 3/2011 | Nagai | H01Q 9/0407 343/700 MS |
| 8,193,990 B2 | 6/2012 | Nakabayashi | |
| 8,482,474 B2 | 7/2013 | Baba | |
| 9,048,531 B2 | 6/2015 | Nozawa | |
| 9,105,975 B2 | 8/2015 | Satou | |
| 2003/0193437 A1 | 10/2003 | Kangasvieri | |
| 2008/0278384 A1 | 11/2008 | Shimasaki | |
| 2009/0109109 A1 * | 4/2009 | Franson | H01Q 1/38 343/770 |
| 2010/0026584 A1 | 2/2010 | Nakabayashi | |
| 2010/0134377 A1 | 6/2010 | Tsai | |
| 2010/0253582 A1 | 10/2010 | Nozawa | |
| 2011/0122039 A1 | 5/2011 | Baba | |
| 2013/0057448 A1 | 3/2013 | Satou | |
| 2013/0135154 A1 | 5/2013 | Sumi | |

FOREIGN PATENT DOCUMENTS

| | | |
|---|---|---|
| JP | 2008283464 A | 11/2008 |
| JP | 2010041090 A | 2/2010 |
| JP | 2010259048 A | 11/2010 |
| JP | 2011166540 A | 8/2011 |
| JP | 2012039465 A | 2/2012 |
| WO | 2009139143 A1 | 11/2009 |
| WO | 2011145323 A1 | 11/2011 |

OTHER PUBLICATIONS

Office Action issued for corresponding Japanese Patent Application No. 2015-522985, 7 pages, dated Jul. 12, 2016.
European Search Report for corresponding EP Application No. 14814394A, 8 pages, dated Jan. 19, 2017.

* cited by examiner

WIRELESS COMMUNICATION DEVICE

TECHNICAL FIELD

The present invention relates to a wireless communication device having a plurality of antennas using an overlapping frequency band.

BACKGROUND ART

Wireless communication devices are available that can engage in a plurality of kinds of wireless communication using an overlapping frequency band such as wireless LAN communication based on the IEEE802.11 standard and wireless communication based on the Bluetooth (registered trademark) standard. Such wireless communication devices have a plurality of antennas to support a plurality of standards (refer, for example, to Patent Literature 1).

CITATION LIST

Patent Literature

[PTL 1] Japanese Patent Laid-Open No. 2010-259048

SUMMARY

Technical Problem

Simultaneous wireless communication of a plurality of antennas in an overlapping frequency band may lead to interference, thus resulting in degraded communication performance. A possible solution to such a problem would be to separate the antennas by a greater distance. However, this results in a device of larger size, making this an undesirable option in some cases.

The present invention has been devised in light of the foregoing, and it is an object of the present invention to provide a wireless communication device that ensures reduced interference between a plurality of antennas without relatively separating the antennas.

Solution to Problem

A wireless communication device according to the present invention includes a first antenna, a second antenna, and a planar conductor. The conductor is arranged adjacent to both of the first and second antennas on one side. A cutout portion is formed in the conductor. The cutout portion extends from an outer edge between positions adjacent to the first and second antennas.

DESCRIPTION OF EMBODIMENTS

A detailed description will be given below of embodiments of the present invention on the basis of the accompanying drawings.

[First Embodiment]

Figure 1:
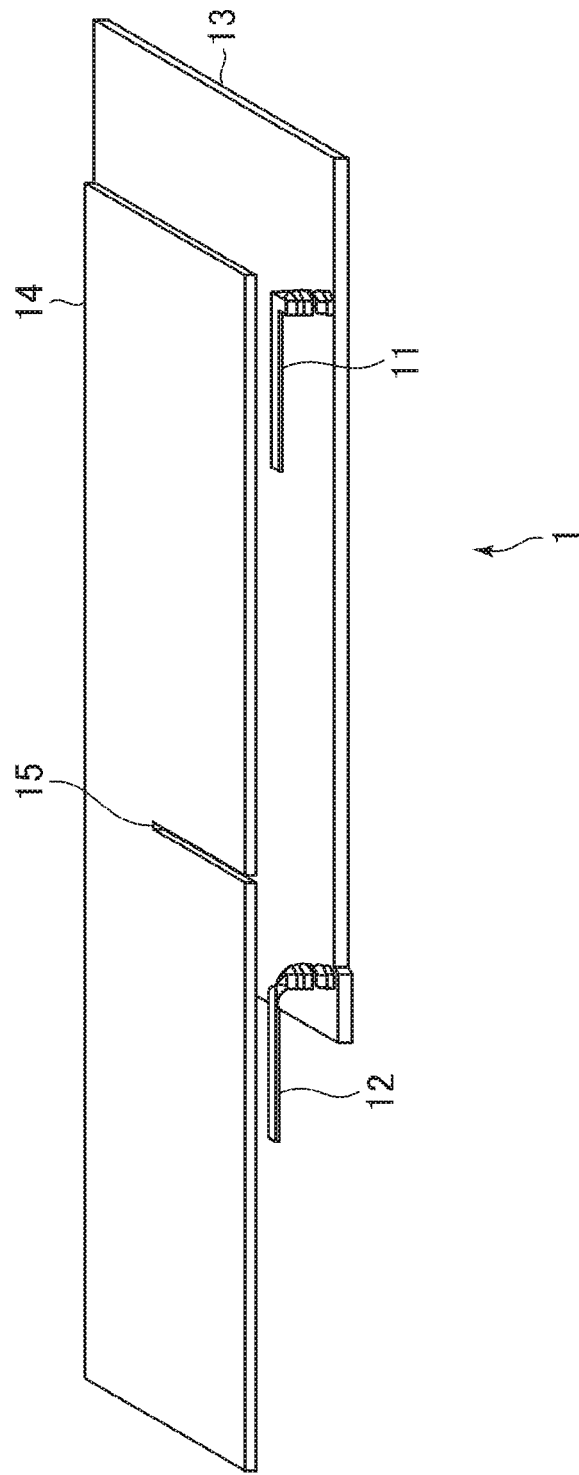
FIG. 1 is a perspective view illustrating an internal configuration of a wireless communication device according to a first embodiment of the present invention.
Figure 2:
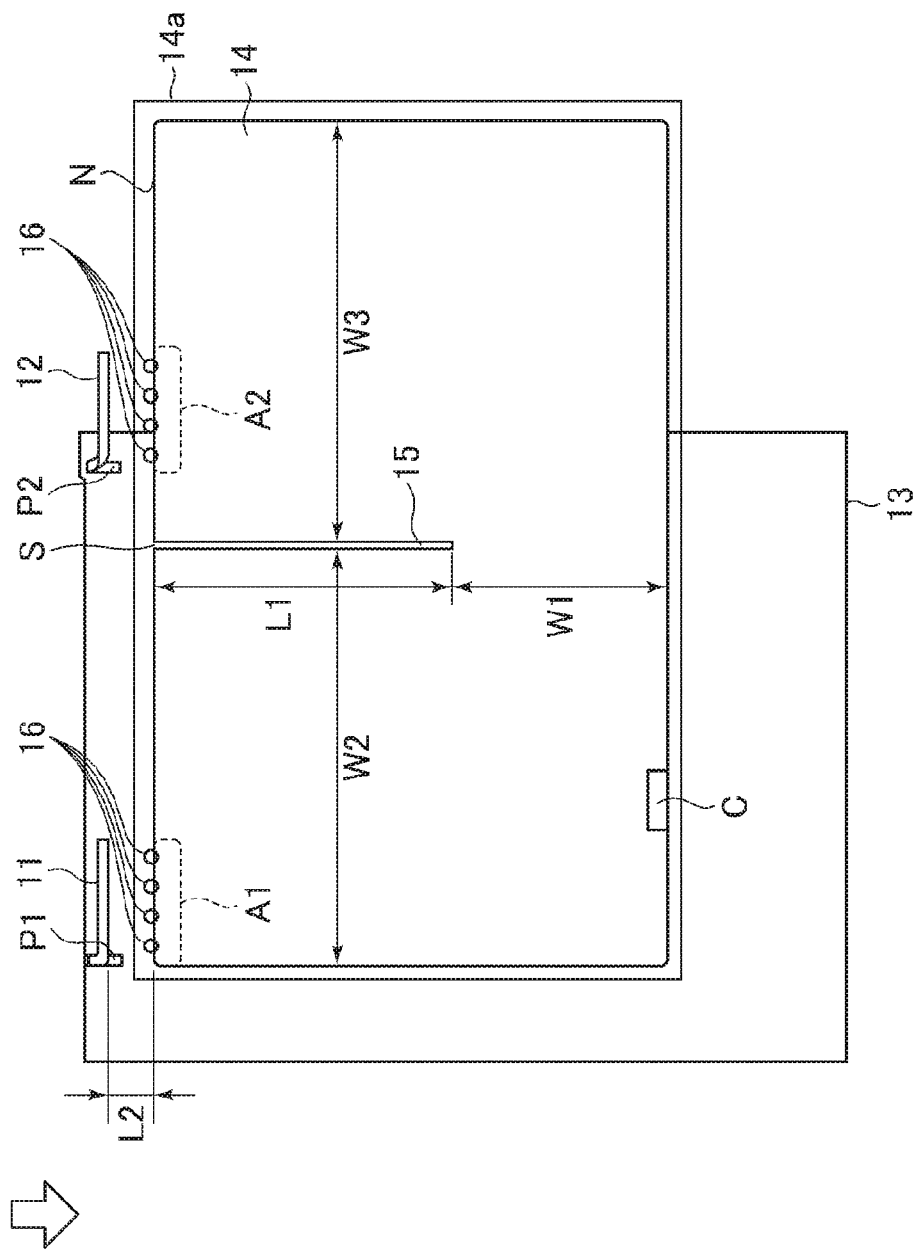
FIG. 2 is a plan view illustrating an internal configuration of the wireless communication device according to the first embodiment of the present invention.
Figure 3:
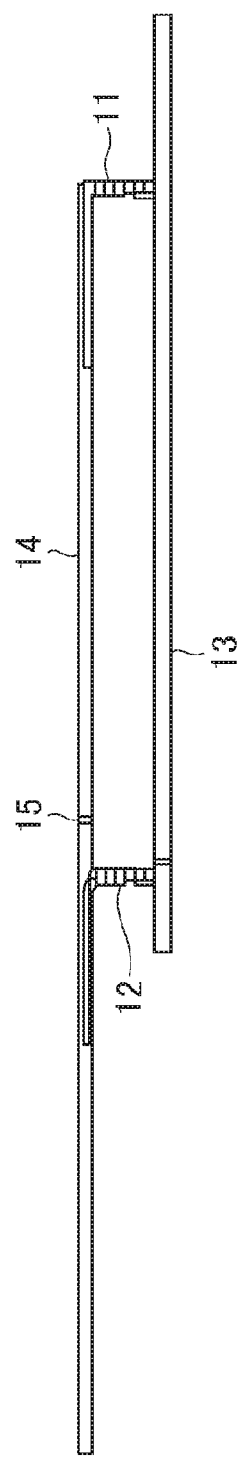
FIG. 3 is a side view illustrating an internal configuration of the wireless communication device according to the first embodiment of the present invention.

A wireless communication device 1 according to a first embodiment of the present invention is, for example, a portable game console or a smartphone and engages in wireless communication using built-in antennas. FIGS. 1, 2, and 3 illustrate major internal components of the wireless communication device 1. FIG. 1 is a perspective view, FIG. 2 a plan view, and FIG. 3 a side view as seen from the direction of the arrow in FIG. 2. As illustrated in these drawings, the wireless communication device 1 includes a first antennas 11, a second antenna 12, a main board 13, and a conductor 14.

The first and second antennas 11 and 12 engage in wireless communication using overlapping frequency bands. More specifically, in the present embodiment, the first antenna 11 engages in wireless LAN communication based on the IEEE802.11 standard, whereas the second antenna 12 engages in wireless communication based on the Bluetooth (registered trademark) standard. Both of these two kinds of wireless communication are achieved using 2.4 GHz frequency bands.

The first and second antennas 11 and 12 are both connected to and powered by the main board 13 for operation. The main board 13 incorporates a communication module (not shown) to control the first and second antennas 11 and 12 for transmitting and/or receiving wireless signals.

Because of the use of overlapping frequency bands, the two antennas may interfere with each other, thus resulting in degraded communication performance. For this reason, in the wireless communication device 1 according to the present embodiment, the planar conductor 14 is arranged in such a manner as to be adjacent to the first and second antennas 11 and 12. In the present embodiment, the conductor 14 is a rectangular copper foil as a whole and affixed to one side of a resin board 14a. It should be noted that the board 14a is not shown in FIGS. 1 and 3.

The conductor 14 is arranged to be approximately parallel and opposed to the main board 13. Both the first and second antennas 11 and 12 are arranged on the same side as seen from the conductor 14. In the description given below, of the outer edges of the conductor 14, the side adjacent to the first and second antennas 11 and 12 will be denoted as an adjacent side N. Further, the conductor 14 is arranged in such a manner that the adjacent side N is parallel to a straight line connecting the first and second antennas 11 and 12. It should be noted, however, that the conductor 14 is not in contact with the first and second antennas 11 and 12, and, as a result, is electrically isolated.

A linear cutout portion 15 is formed in the conductor 14. The cutout portion 15 is formed in such a manner as to extend from a start point S located on the adjacent side N in the direction of moving away from both of the first and second antennas 11 and 12. Further, the start point S is located between an area A1 of the conductor 14 adjacent to the first antenna 11 and an area A2 of the conductor 14 adjacent to the second antenna 12. The cutout portion 15 extends toward the center of the conductor 14 along the direction perpendicular to the adjacent side N.

A length L1 from the start point S of the cutout portion 15 to the deepest portion thereof should preferably be determined in accordance with a wavelength $\lambda$ of radio waves used by the first and second antennas 11 and 12. More specifically, the length L1 of the cutout portion 15 should preferably be determined to be approximately $\lambda/4$. In the present embodiment, the wavelength of radio waves at a frequency of 2.4 GHz used by the first and second antennas 11 and 12 is approximately 125 mm. Therefore, the length L1 of the cutout portion 15 need only be approximately 31 mm. It should be noted that if the board 14a where the cutout portion 15 is provided is made of a dielectric, the electrical length of the cutout portion 15 varies depending on the permittivity of the dielectric. In this case, it is only necessary to determine the length L1 of the cutout portion 15 so that the electrical length thereof is approximately $\lambda/4$. Therefore, using the board 14a made of a dielectric makes it possible to reduce the physical length L1 of the cutout portion 15.

The conductor 14 having the cutout portion 15 configured as described above is arranged adjacent to both the first and second antennas 11 and 12, thus forming a U-shaped current path where currents wrap around the cutout portion 15 in flowing through the conductor 14. Further, the cutout part resonates at the frequency in use, thus bringing together the currents and reducing the amount of currents that wrap around to the other antenna. This contributes to reduced interference between the first and second antennas 11 and 12 caused by radio waves traveling in the air between the two antennas.

Further, the position of the conductor 14 and the sizes of other components may also be determined in accordance with the wavelength $\lambda$ of radio waves used by the first and second antennas 11 and 12. More specifically, a distance L2 between the first and second antennas 11 and 12 and the conductor 14 should preferably be greater than 0 and $\lambda/10$ or smaller. Further, a distance W1 between the deepest portion of the cutout portion 15 and the side opposite to the adjacent side N of the conductor 14 should preferably be $\lambda/10$ or greater. Still further, a distance W2 from one end of the adjacent side N facing the first antenna 11 to the cutout portion 15 should preferably exceed the length from a feed point P1 of the first antenna 11 to the open end. Similarly, a distance W3 from one end of the adjacent side N facing the second antenna 12 to the cutout portion 15 should preferably exceed the length from a feed point P2 of the second antenna 12 to the open end.

The conductor 14 may be used not only to reduce interference between the antennas but also for other purposes. For example, the conductor 14 may incorporate a variety of circuit elements making up electronic circuitry such as touch sensor, IC chip, and NFC resonator. Further, in the present embodiment, the conductor 14 is electrically connected to the main board 13 via a connection section C shown in FIG. 2, sharing the ground thereof with the main board 13. However, if the conductor 14 is used only to reduce interference between the antennas rather than serving other functionality, there is no need to electrically connect the conductor 14 and the main board 13.

Figure 4:
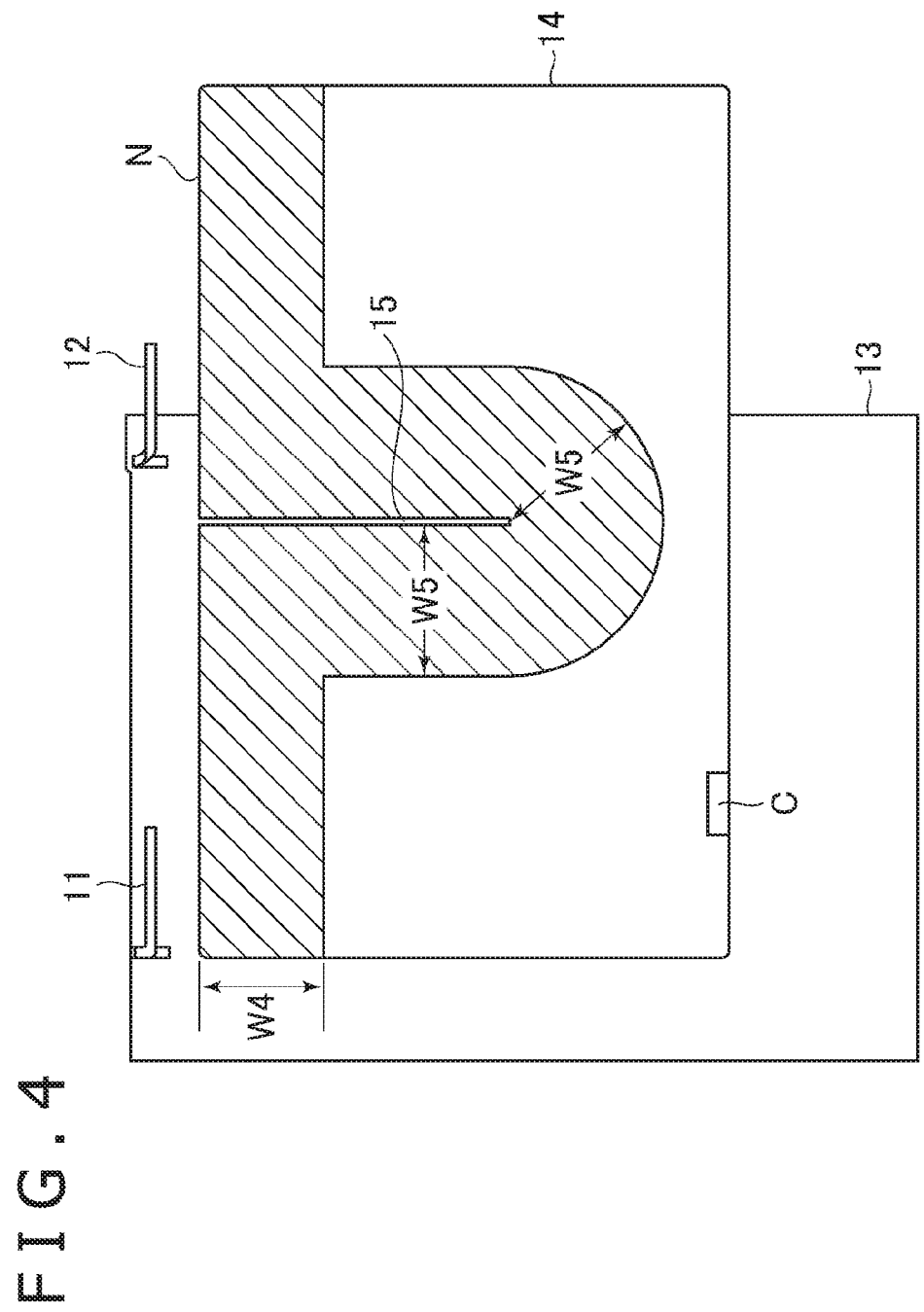
FIG. 4 is a diagram illustrating a restricted area where a connection section for connection with a main board should not be provided.

It should be noted that if the conductor 14 and the main board 13 are electrically connected, it is not preferred that the connection section C should be provided near the adjacent side N. Instead, the connection section C should preferably be provided near the opposite side as illustrated in FIG. 2. FIG. 4 is a diagram illustrating a restricted area in the conductor 14 where the connection section C for connection with the main board 13 should not be provided. The restricted area is shown as a diagonally hatched area. The restricted area includes a portion having a width W4 and a portion with a width W5. The portion with the width W4 is opposed to the first and second antennas 11 and 12 along the adjacent side N. The portion with the width W5 surrounds the cutout portion 15. Here, the width W4 is $\lambda/10$, and the width W5 is $\lambda/8$.

Further, in the present embodiment, the first and second antennas 11 and 12 are arranged to be opposed to the outer edge portion of the conductor 14 to provide the conductor 14 with improved capability to reduce interference between the antennas. More specifically, the conductor 14 is arranged to overlap the first and second antennas 11 and 12 as seen from the side face (i.e., direction parallel to the front face of the conductor 14) as illustrated in FIG. 3. Further, the positions of the conductor 14 adjacent to the first and second antennas 11 and 12 (positions of the areas A1 and A2 in FIG. 2) may be relatively thicker than other areas. In order to render these positions thicker as described above, a plurality of metallic screws 16 are fastened near the areas A1 and A2 of the board 14a in the present embodiment. It should be noted that the screws 16 are not shown in FIGS. 1 and 3 as with the board 14a. These screws 16 are in contact with a copper foil making up the main body of the conductor 14, thus making up part of the conductor 14. As a result, the conductor 14 has areas thicker than other areas at positions opposed to the first and second antennas 11 and 12. It should be noted that through holes having metal plated inner walls may be provided in place of or in addition to the screws 16 in such a manner as to be connected to the main body of the conductor 14 so as to render the conductor 14 thicker.

Figure 5:
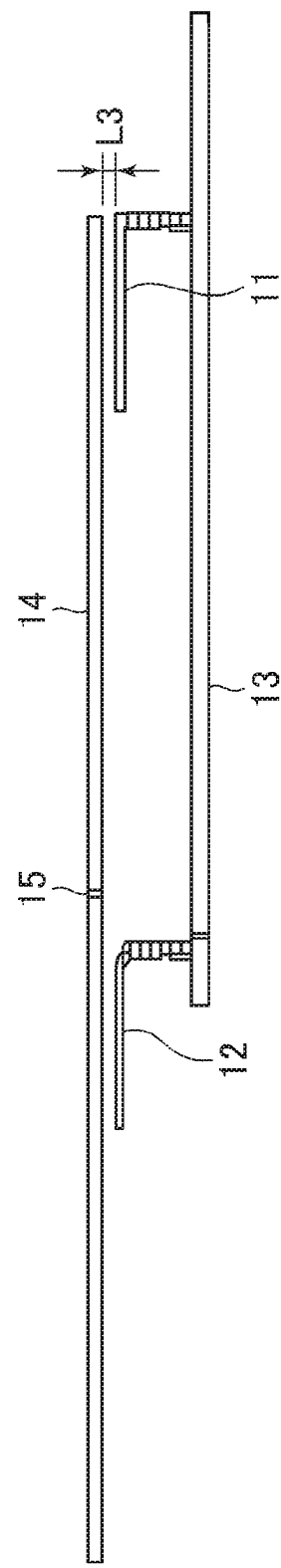
FIG. 5 is a diagram illustrating a modification example of a position where a conductor is arranged.

Further, it is not absolutely necessary for the first and second antennas 11 and 12 and the conductor 14 to overlap as seen from the side face. FIG. 5 is a diagram illustrating a case in which the conductor 14 is above the first and second antennas 11 and 12 as seen from the side face. It should be noted that even if the conductor 14 is above or below the first and second antennas 11 and 12, the conductor 14 should preferably be arranged so that a length L3 from the conductor 14 to each of the first and second antennas 11 and 12 along the direction perpendicular to the front face of the conductor 14 is $\lambda/10$ or smaller.

Figure 6:
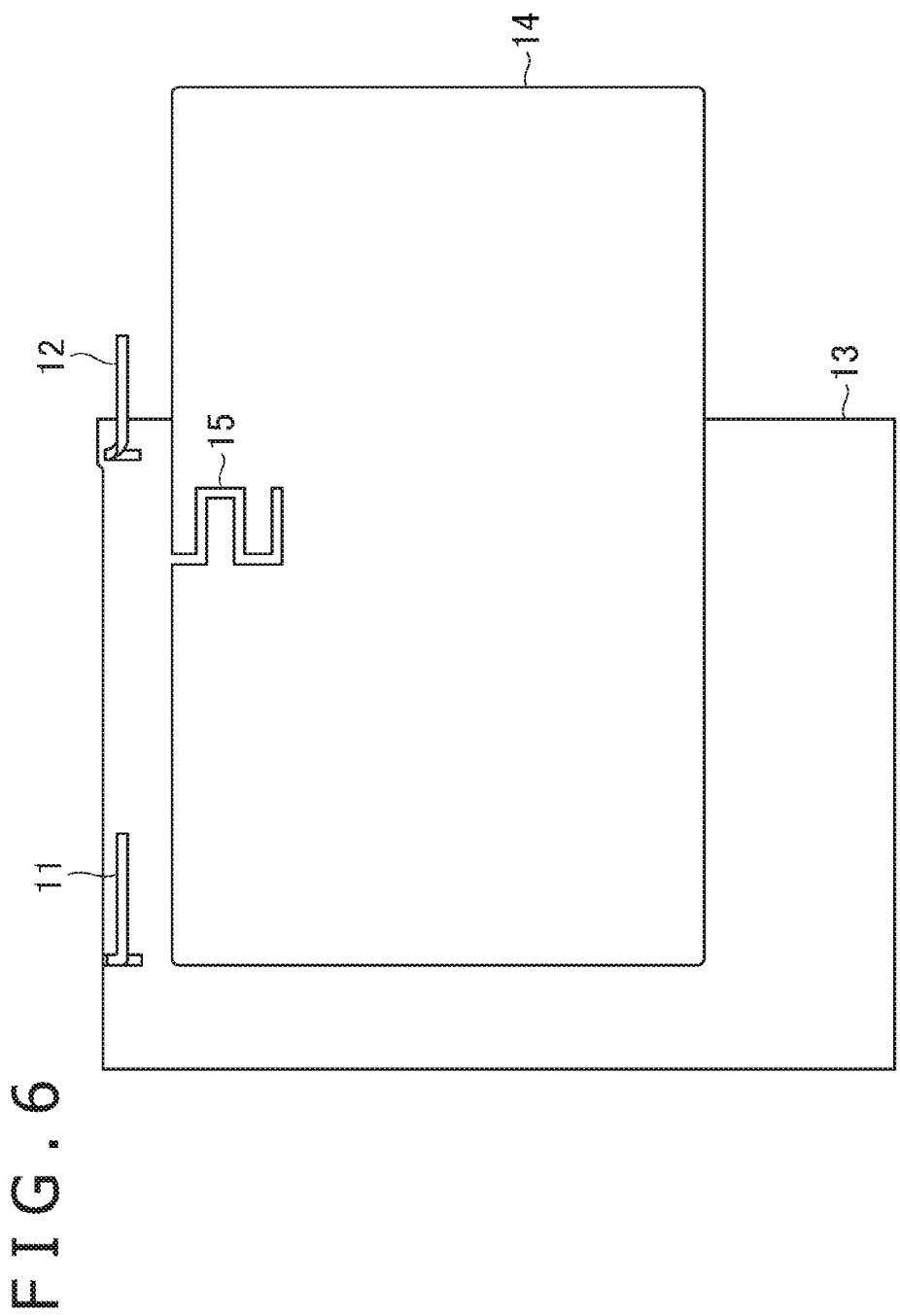
FIG. 6 is a diagram illustrating a modification example of a cutout portion.

In the description given above, the cutout portion 15 is formed linearly. However, the shape of the cutout portion 15 is not limited to being linear. Instead, for example, the cutout portion 15 may be formed in a meandering shape as illustrated in FIG. 6. This contributes to a reduced linear distance from the outer edge of the conductor 14 to the deepest portion of the cutout portion 15 while at the same time providing a length equivalent to approximately $\lambda/4$ electrical length as an overall length of the cutout portion 15 as in FIG. 2.

Further, a length L of the cutout portion 15 may be variable. For example, if the first and second antennas 11 and 12 are dual band antennas that support a plurality of frequency bands, the radio wave frequency that leads to interference varies depending on the frequency band used by each of the antennas. Still further, if the first and second antennas 11 and 12 switch between bands (channels) of a relatively wide frequency band for use, the frequency used by these antennas also vary. For this reason, changing the length L of the cutout portion 15 in accordance with the variation in frequency ensures reduced interference in a particularly problematic frequency band.

Figure 7:
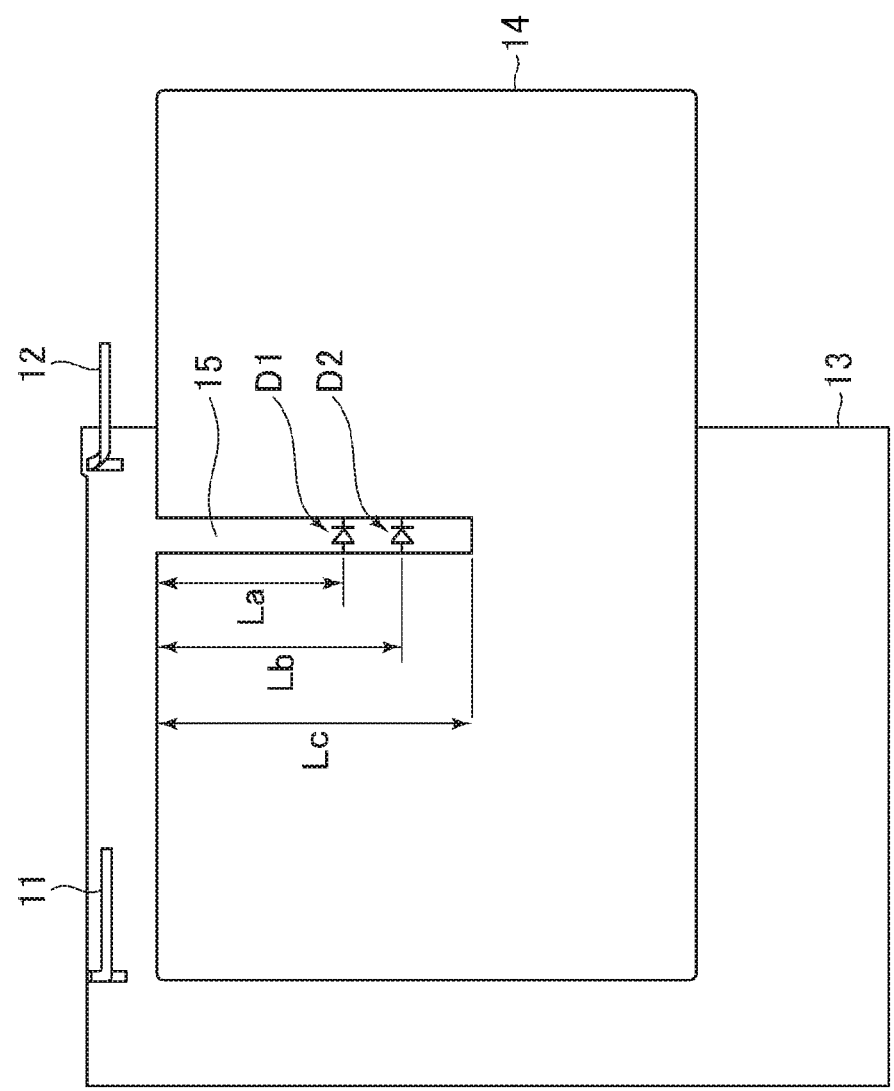
FIG. 7 is a diagram illustrating an example of a cutout portion whose length can be changed.

A possible method to vary the length L of the cutout portion 15 is, for example, to provide diodes midway along the cutout portion 15. FIG. 7 is a diagram illustrating an example of a structure of the conductor 14 when such a method is adopted. Two diodes D1 and D2 are provided midway along the cutout portion 15. In the example shown in the drawing, when a voltage is applied across the diode D1, the diode D1 conducts. As a result, the effective length of the cutout portion 15 is equal to La in the drawing. On the other hand, when a voltage is applied across the diode D2 without applying a voltage across the diode D1, the diode D1 goes into cutoff, and the diode D2 conducts. As a result, the length of the cutout portion 15 is equal to Lb. Further, when no voltage is applied across the diode D1 and D2, the length of the cutout portion 15 is equal to Lc. As described above, the electrical length of the cutout portion 15 can be changed step by step by controlling the plurality of diodes D to turn ON or OFF. Such control of the diodes D to turn ON or OFF can be achieved by causing the control circuit incorporated in the main board 13 to output a control signal that matches the frequency of wireless communication in which the first and second antennas 11 and 12 engage. It should be noted that although a case is shown here in which the length L of the cutout portion 15 is varied in three steps, the length L may be changed in two steps by using only a single diode, or in more steps by using more diodes.

Figure 8:
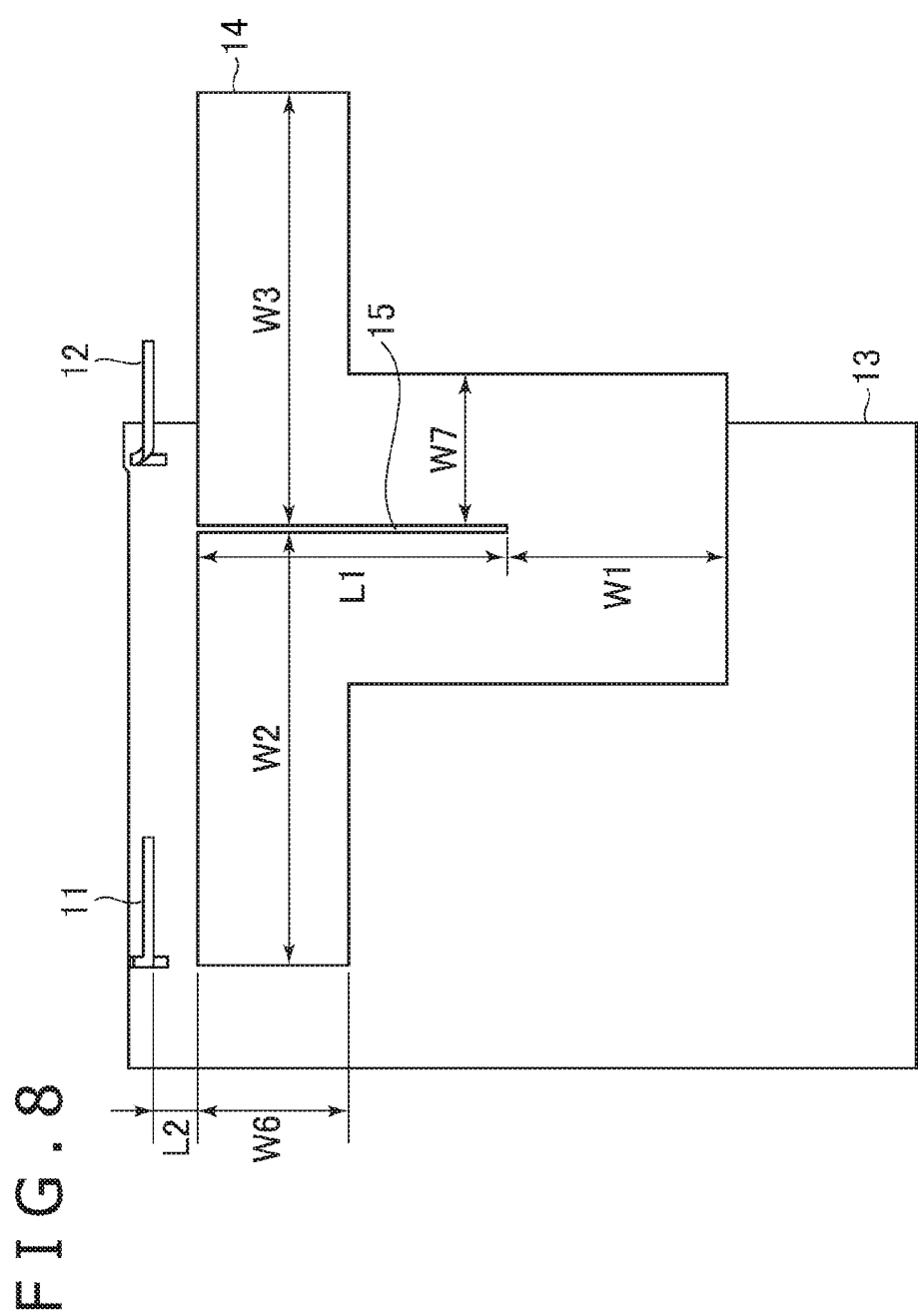
FIG. 8 is a diagram illustrating a modification example of a conductor shape.

Further, although rectangular in the above description, the conductor 14 may be in other shape so long as a current path can be formed which wraps around the cutout portion 15. FIG. 8 illustrates another example of a shape of the conductor 14. In the example shown in the drawing, the conductor 14 includes three portions, one opposed to the first antenna 11, another opposed to the second antenna 12, and still another that is U-shaped, connects the above two portions, and wraps around the cutout portion 15. In the case shown in the drawing, the distances L1, L2, W1, W2, and W3 shown in the drawing should also preferably meet the same size requirements as for the rectangular conductor 14 described above. Further, a width W6 of each of the portions opposed to the first and second antennas 11 and 12 should preferably be $\lambda/10$ or greater. On the other hand, a width W7 of the U-shaped portion should preferably be $\lambda/10$ or greater.

Figure 9:
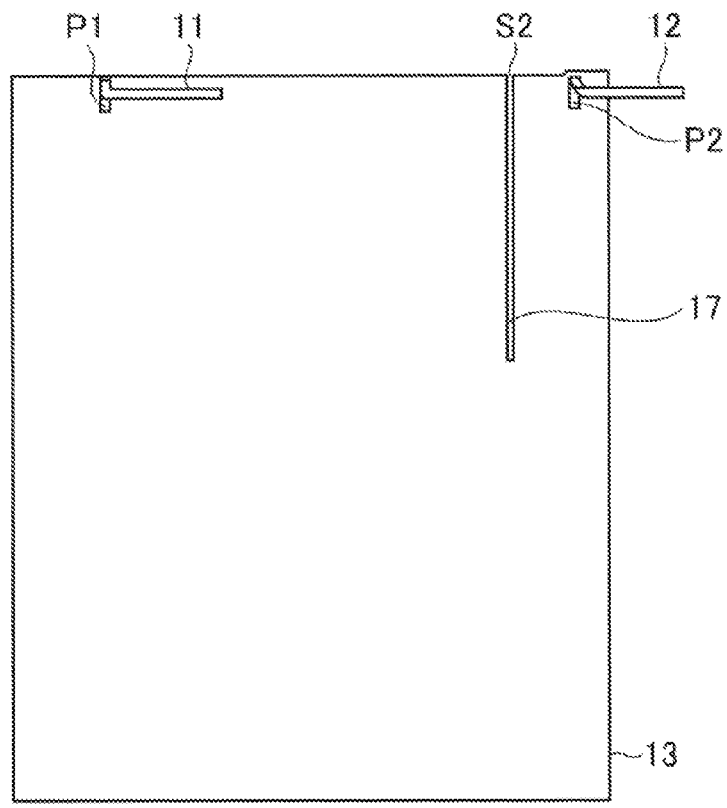
FIG. 9 is a diagram illustrating an example in which a cutout portion is provided in the main board.

Further, in the wireless communication device 1 according to the present embodiment, a cutout portion 17 may also be formed in the main board 13. FIG. 9 is a diagram illustrating a configuration of the main board 13 in this case. The cutout portion 17 of the main board 13 is designed to reduce the impact of interference caused by a current flowing between the first and second antennas 11 and 12 via the main board 13. A start point S2 of the cutout portion 17 is located between two positions on an outer edge of the main board 13, one closest to the feed point P1 of the first antenna 11 and another closest to the feed point P2 of the second antenna 12. It should be noted that the start point S2 should preferably be located near the midpoint between the point closest to the feed point P1 and the point closest to the feed point P2 on an outer edge of the conductor 14. Then, the cutout portion 17 extends from the start point S2 in such a manner as to pass between the positions of the first and second antennas 11 and 12. Providing the cutout portion 17 configured as described above ensures that currents flowing through the main board 13 wrap around the cutout portion 17 between the first and second antennas 11 and 12, thus making it unlikely for these currents to cause interference. In the example shown in the drawing, the cutout portion 17 is formed at a position and in an orientation that coincide with those of the cutout portion 15 in plan view.

The length of the cutout portion 17 may be determined to be a length equivalent to approximately $\lambda/4$ electrical length in accordance with the wavelength of radio waves transmitted and/or received by the first and second antennas 11 and 12 as with that of the cutout portion 15. Alternatively, the cutout portion 17 may differ in length from the cutout portion 15. If the two cutout portions are different in length, it is possible to provide reduced interference in a plurality of frequency bands without varying the lengths of the cutout portions. Further, the cutout portion 17 is not limited to being linear and may be in a meandering shape as with the cutout portion 15 of the conductor 14. Still further, the length of the cutout portion 17 may be variable.

The embodiment of the present invention is not limited to that described above. For example, although the main body of the conductor 14 is a copper foil formed on the board 14*a* in the description given above, a foil made of other metallic material may also be used. Alternatively, the conductor 14 may be a metallic plate such as steel plate having a certain degree of thickness. In this case, the conductor 14 need not necessarily be bonded to a board made of an insulator or dielectric. Still alternatively, this metallic plate may be an external cabinet making up an enclosure of the wireless communication device 1. Still alternatively, the areas of this metallic plate adjacent to the first and second antennas 11 and 12 may be bent to make these areas thicker than other areas. A detailed description will be given later of a specific example in which the conductor 14 is formed with a bent metallic plate as described above as a second embodiment. Further, the first and second antennas 11 and 12 may be designed to engage in wireless communication based on a standard other than wireless LAN or Bluetooth and may use a frequency band other than a 2.4 GHz band.

[Second Embodiment]

A description will be given below of a wireless communication device according to a second embodiment of the present invention. The wireless communication device according to the second embodiment includes the first and second antennas 11 and 12, the main board 13, and the conductor 14, with the cutout portion 15 formed in the conductor 14 as in the first embodiment. The functionality of each of these members is basically the same as that in the first embodiment. Therefore, the detailed description of the functionality thereof will be omitted. Unlike in the first embodiment, the conductor 14 is formed with a bent metallic plate in the present embodiment, thus making the board 14*a* unnecessary.

Figure 10:
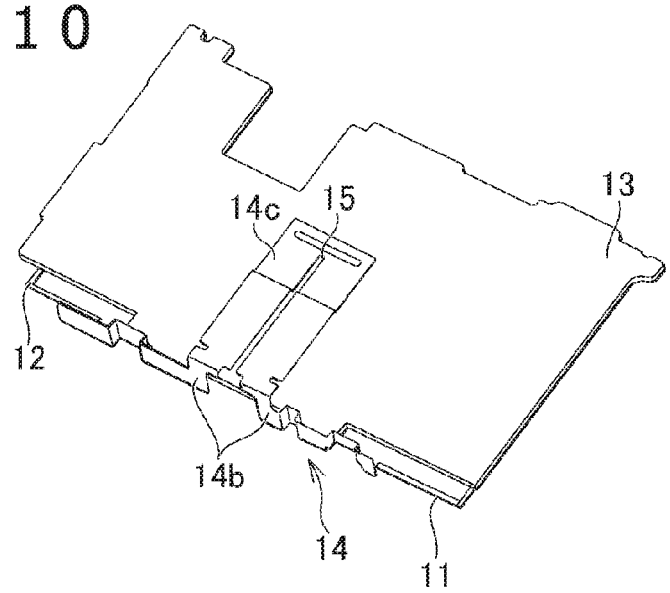
FIG. 10 is a perspective view illustrating an internal configuration of a wireless communication device according to a second embodiment of the present invention.
Figure 11:
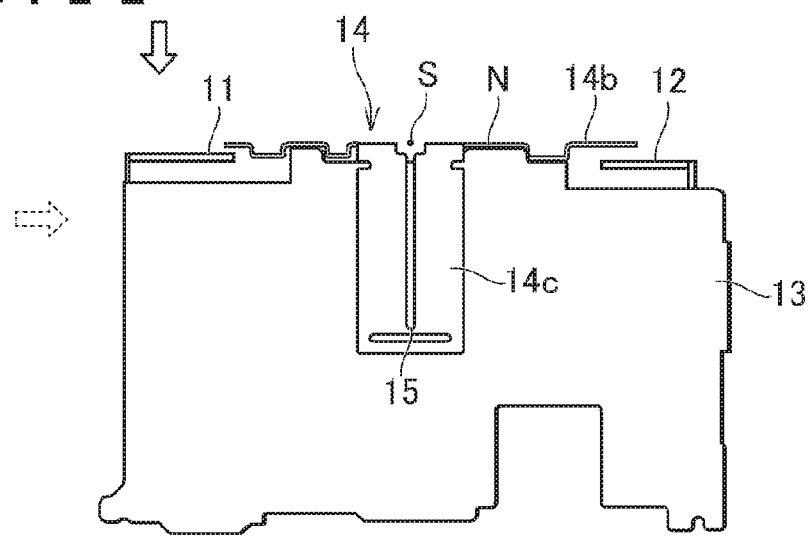
FIG. 11 is a plan view illustrating an internal configuration of the wireless communication device according to the second embodiment of the present invention.
Figure 12:
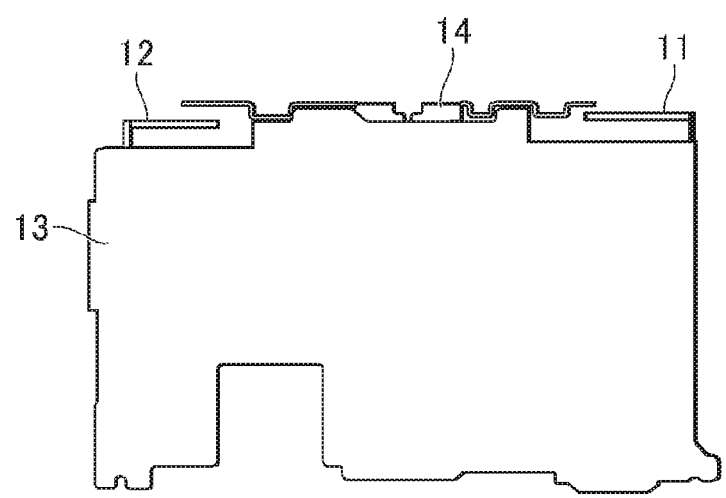
FIG. 12 is a bottom view illustrating an internal configuration of the wireless communication device according to the second embodiment of the present invention.
Figure 13:
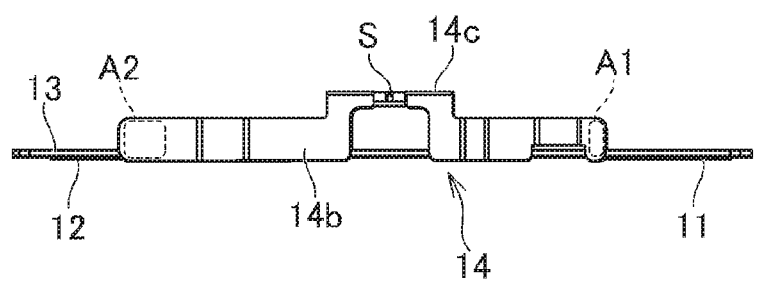
FIG. 13 is a side view illustrating an internal configuration of the wireless communication device according to the second embodiment of the present invention.
Figure 14:
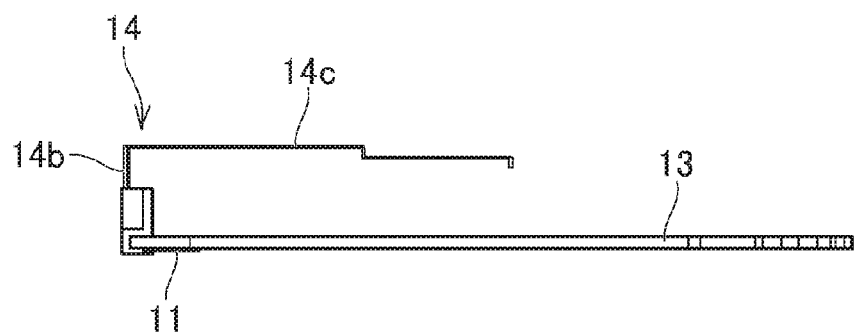
FIG. 14 is another side view illustrating an internal configuration of the wireless communication device according to the second embodiment of the present invention.

FIGS. 10, 11, 12, 13, and 14 are diagrams illustrating major internal components of the wireless communication device according to the present embodiment. FIG. 10 is a perspective view, FIG. 11 a plan view, FIG. 12 a bottom view, FIG. 13 a side view as seen from the direction indicated by a solid block arrow in FIG. 11, and FIG. 14 a side view as seen from the direction indicated by a dashed block arrow in FIG. 11.

As illustrated in these drawings, unlike in the first embodiment, each of the first and second antennas 11 and 12 in the present embodiment is arranged to protrude horizontally from one end of the main board 13.

The conductor 14 is arranged to be approximately perpendicular to the main board 13. The conductor 14 includes an adjacent portion 14b and a main body portion 14c. The adjacent portion 14b is adjacent to the first and second antennas 11 and 12. The main body portion 14c is formed by bending from the adjacent portion 14b and arranged approximately parallel to the main board 13.

The adjacent portion 14b is fastened to the enclosure of the wireless communication device in such a manner as to stand up in a direction approximately perpendicular to the main board 13. Further, the adjacent portion 14b is arranged on the side on which the first and second antennas 11 and 12 are connected as seen from the main board 13. It should be noted, however, that the conductor 14 is arranged at a distance from and is not in direct contact with the main board 13 to prevent electrical continuity therebetween. The adjacent portion 14b has its center area cut out by the cutout portion 15, horizontally dividing the adjacent portion 14b into two parts. As a result, the adjacent portion 14b has wing portions, one extending to the left and another to the right. The tips of these wing portions make up the areas A1 and A2 adjacent respectively to the first and second antennas 11 and 12. It should be noted that, in the present embodiment, the outer edge on which the adjacent portion 14b is formed as seen in plan view of the conductor 14 is the adjacent side N.

The main body portion 14c extends approximately perpendicularly from the upper end of the adjacent portion 14b toward the center of the main board 13. Further, the main body portion 14c is U-shaped as a whole because of the cutout portion formed in the center of the main body portion 14c. The cutout portion 15 is formed to extend linearly toward the center of the main board 13 from the start point S on the adjacent side N as seen in plan view as in the first embodiment. Here, the start point S is located between the areas A1 and A2 adjacent respectively to the first and second antennas 11 and 12.

In the present embodiment, the conductor 14 having the cutout portion 15 is arranged adjacent to both the first and second antennas 11 and 12 as in the first embodiment, thus forming a U-shaped current path where currents wrap around the cutout portion 15 in flowing through the conductor 14. Further, the cutout part resonates at the frequency in use, thus bringing together the currents and reducing the amount of currents that wraps around to the other antenna. This contributes to reduced interference between the first and second antennas 11 and 12 caused by radio waves traveling in the air between the two antennas.

Further, the conductor 14 is bent on the adjacent side N in the present embodiment, thus rendering the areas A1 and A2 of the conductor 14 adjacent respectively to the first and second antennas 11 and 12 thicker than the main body portion 14c. Further, because the conductor 14 is bent on the adjacent side N, the first and second antennas 11 and 12 are closer respectively to the areas A1 and A2 when the main board 13 and the conductor 14 are seen from the side face. As described in the first embodiment with reference to FIG. 5, the distance L3 between the first and second antennas 11 and 12 and the areas A1 and A2 of the conductor 14 adjacent to the respective antennas along the direction perpendicular to the main body portion 14c should preferably be λ/10 or smaller. In the present embodiment, the adjacent portion 14b including the areas A1 and A2 is bent relative to the main body portion 14c. This makes it possible to arrange the areas A1 and A2 close respectively to the first and second antennas 11 and 12 despite the fact that the main body portion 14c is located far, to a certain extent, from the main board 13.

The invention claimed is:

1. A wireless communication device, comprising:
   a first antenna that is elongate and extends in a first longitudinal direction;
   a second antenna that is elongate and extends in a second longitudinal direction; and
   a planar conductor arranged laterally adjacent to both of the first and second antennas on one side, thereby defining a first area of the planar conductor adjacent to the first antenna and a second area of the planar conductor adjacent to the second antenna,
   wherein the planar conductor includes a first cutout portion that extends from an outer edge thereof in a transverse direction with respect to the first and second longitudinal directions, such that the first cutout portion extends between the first and second areas.

2. The wireless communication device of claim 1, wherein the length of the first cutout portion is variable.

3. The wireless communication device of claim 1, wherein the planar conductor is arranged to overlap the first and second antennas as seen from a side face.

4. The wireless communication device of claim 1, wherein the respective first and second areas of the planar conductor at positions adjacent to the first and second antennas are thicker than other areas.

5. The wireless communication device of claim 1, further comprising: a board connected to the first and second antennas, wherein the board includes a second cutout portion extending from an outer edge of the board and passing between a position to which the first antenna is connected and a position to which the second antenna is connected.

6. The wireless communication device of claim 1, wherein the planar conductor is bonded to a board made of a dielectric.

7. The wireless communication device of claim 1, wherein the planar conductor is bonded to a board that incorporates circuit elements making up electronic circuitry.

8. A wireless communication device, comprising:
   a first antenna;
   a second antenna;
   a board to which the first and second antennas are connected, the board including a first cutout portion extending from an outer edge of the board and passing between respective positions at which the first and second antennas are connected to the board, respectively; and
   a planar conductor arranged adjacent to both of the first and second antennas, and including a second cutout portion that extends from an outer edge between positions adjacent to the first and second antennas.

* * * * *